(12) United States Patent
Villarreal et al.

(10) Patent No.: US 8,136,838 B2
(45) Date of Patent: Mar. 20, 2012

(54) AIRBAG

(75) Inventors: Carlos Aaron Villarreal, Torreón (MX);
Neil Alan Teichman, Linden, MI (US);
Jason Bradley Peters, Lapeer, MI (US)

(73) Assignee: TK Holdings Inc., Auburn Hills, MI (US)

( * ) Notice: Subject to any disclaimer, the term of this patent is extended or adjusted under 35 U.S.C. 154(b) by 115 days.

(21) Appl. No.: 12/230,713

(22) Filed: Sep. 3, 2008

(65) Prior Publication Data

US 2009/0058049 A1 Mar. 5, 2009

Related U.S. Application Data

(60) Provisional application No. 60/935,861, filed on Sep. 4, 2007.

(51) Int. Cl.
*B60R 21/2338* (2011.01)
*B60R 21/232* (2011.01)

(52) U.S. Cl. .................. 280/743.2; 280/730.2

(58) Field of Classification Search ............... 280/730.1, 280/730.2, 743.2
See application file for complete search history.

(56) References Cited

U.S. PATENT DOCUMENTS

| | | | |
|---|---|---|---|
| 6,010,149 A * | 1/2000 | Riedel et al. ............... | 280/730.2 |
| 6,164,696 A * | 12/2000 | Ellerbrok et al. .......... | 280/743.2 |
| 6,431,599 B1 * | 8/2002 | Bohn .......................... | 280/743.1 |
| 6,672,612 B2 * | 1/2004 | Sauer et al. ................ | 280/730.2 |
| 2005/0121887 A1 * | 6/2005 | Inoue et al. ................ | 280/730.2 |
| 2007/0046001 A1 * | 3/2007 | Hirata ......................... | 280/730.2 |
| 2007/0152430 A1 * | 7/2007 | Wollin et al. .................. | 280/729 |
| 2007/0182143 A1 * | 8/2007 | Wright ........................ | 280/743.2 |
| 2007/0205590 A1 * | 9/2007 | Klinkenberger et al. ... | 280/743.2 |
| 2007/0267856 A1 * | 11/2007 | Schedler .................... | 280/743.2 |
| 2007/0273134 A1 * | 11/2007 | Kuroe ........................ | 280/743.2 |
| 2008/0290634 A1 * | 11/2008 | Sugimori et al. .......... | 280/728.2 |

* cited by examiner

*Primary Examiner* — Eric Culbreth
*Assistant Examiner* — Barry Gooden, Jr.
(74) *Attorney, Agent, or Firm* — Foley & Lardner LLP

(57) ABSTRACT

An occupant side-impact protection apparatus for a motor vehicle, including an inflatable cushion stored in a folded configuration and an inflator configured to provide gas to inflate the cushion. The cushion is configured to inflate to form a curtain to protect the head and upper torso of the occupant of a vehicle. The apparatus includes a tension tether, having a first end coupled at a first portion of the cushion and a second end coupled to a second portion of the cushion, to provide tension to the cushion during its unfolding. The cushion is further configured to deploy along the internal side of the vehicle, wherein the first portion of the cushion is located proximate to the rear of the cushion along an edge of the cushion that trails the remainder of the cushion as the cushion unfolds, and wherein the second portion of the cushion is located proximate to the rear of the cushion along an edge of the cushion that leads the remainder of the cushion as the cushion unfolds.

10 Claims, 2 Drawing Sheets

AIRBAG

CROSS REFERENCE TO RELATED APPLICATION

The present application claims the benefit of and priority to U.S. Provisional Patent Application No. 60/935,861 filed Sep. 4, 2007. The foregoing provisional application is incorporated by reference herein in its entirety.

BACKGROUND

The present application relates generally to the field of airbags in automotive vehicles, and more specifically relates to a mechanism for providing tension to a curtain airbag during its deployment.

SUMMARY

According to an exemplary disclosed embodiment, an occupant side-impact protection apparatus is provided, for protecting at least one occupant of a vehicle. The apparatus includes an inflatable cushion stored in a folded configuration, an inflator configured to provide gas to inflate the cushion, and at least one tension tether. The tension tether includes a first end coupled at a first portion of the cushion, which may be coupled to the protection apparatus or to the vehicle, and a second end coupled to the second portion of the cushion, to provide tension to the cushion during its unfolding. The cushion is configured to inflate to form a curtain to protect the head and upper torso of the occupant.

The cushion may be additionally configured to deploy along the internal side of the vehicle, wherein the first portion of the cushion is located proximate to the rear of the cushion along an edge of the cushion that trails the remainder of the cushion as the cushion unfolds, and wherein the second portion of the cushion is located proximate to the rear of the cushion along an edge of the cushion that leads the remainder of the cushion as the cushion unfolds. The tension tether is configured to extend substantially downward and during deployment provides a tension force on the cushion to prevent the cushion from being displaced. The apparatus may be fixedly connected to the roof rail of a vehicle by a plurality of attachment members which are located along the trailing edge.

According to an alternative disclosed embodiment, an occupant side-impact protection apparatus is provided, which protects at least one occupant of a vehicle. The apparatus includes an inflatable cushion stored in a folded configuration, an inflator configured to provide gas to inflate the cushion, and at least one tension tether. The tension tether includes a first end coupled at the outboard side of a first portion of the cushion, which may be coupled to the protection apparatus or to the vehicle, and a second end coupled to the inboard side of a second portion of the cushion, to provide tension to the cushion during deployment.

The cushion is configured to inflate to form a curtain to protect the head and upper torso of an occupant of a vehicle. The cushion may be additionally configured to deploy along the internal side of the vehicle, wherein the first portion of the cushion is located proximate to the rear of the cushion along an edge of the cushion that trails the remainder of the cushion as the cushion unfolds, and wherein the second portion of the cushion is located proximate to the rear of the cushion along an edge of the cushion that leads the remainder of the cushion as the cushion unfolds. The tension tether is configured to extend substantially downward and during deployment provides a tension force on the cushion to prevent the cushion from being displaced. The apparatus cushion may be fixedly connected to the roof rail of a vehicle by a plurality of attachment members which are located along the trailing edge.

DETAILED DESCRIPTION

Figure 1:
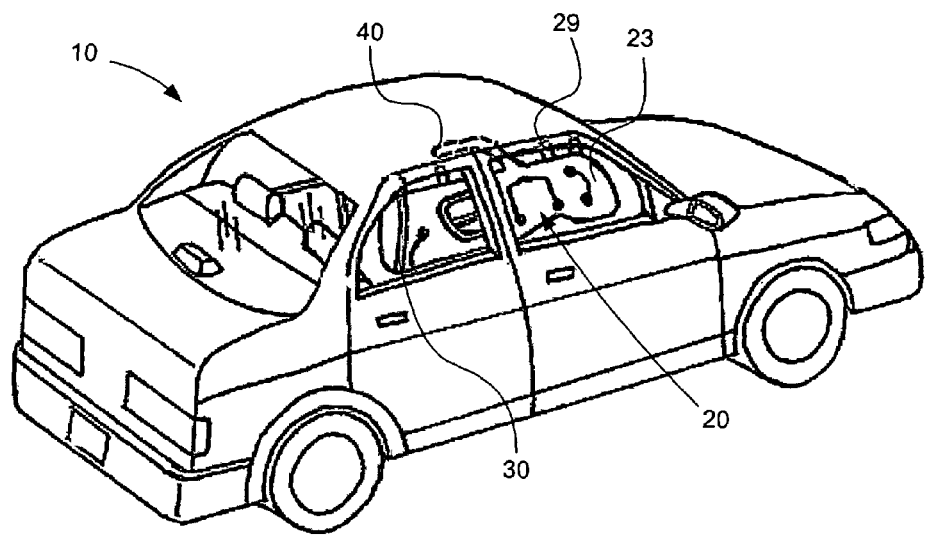
FIG. 1 is a perspective view of an exemplary embodiment of an automotive vehicle that includes a side curtain airbag system having a tension tether.

Side curtain airbag systems are located in vehicles to help protect occupants from injury during a dynamic vehicle impact or rollover event. A side curtain airbag system may include a cushion that deploys during a dynamic vehicle side-impact event or rollover event, and inflate from gas which is rapidly pushed into the inflatable cushion of the airbag system by means of an inflator. An inflator may use a pyrotechnic device to generate gas almost instantaneously and push the gas at a high volumetric flow rate into the inflatable cushion of the airbag system. A side curtain cushion or airbag is generally stored within and deployed from the roof rail of a vehicle, which is the portion located between the door frame and roof. Side curtain airbags are typically packaged through a process of folding and rolling to compact the airbag in order for it to fit into the small cross-section of the vehicle roof rail. After installation, the airbag may be stored behind a roof liner or headliner to provide improved interior vehicle appearance. Side curtain airbags may be used to provide protection to occupants located in any seating row (e.g., first, second, third) of a vehicle and typically provide protection to outboard occupants when deployed. Often a single side curtain airbag is configured with multiple inflatable portions to provide protection to multiple occupants, located in different seating rows.

A side curtain airbag may include a tensioning strap which is connected to the airbag and a location on the vehicle (e.g., A-pillar to B-pillar, B-pillar to C-pillar, A-pillar to C-pillar). The tensioning strap may include a first end fixedly connected to the airbag and a second end connected to a rod assembly, such that the end of the tensioning strap is slidable along the rod of the rod assembly. The rod may be positioned to run longitudinally along a pillar of the vehicle. During deployment, the end of the tensioning strap connected to the airbag moves substantially downward being driven by the unfolding of the airbag, and the opposite end of the tensioning strap translates substantially downward along the slidable connection to the rod. The use of the tensioning strap may help the airbag maintain a position between the window or door of the vehicle and the occupant, when an occupant is propelled into contact with the airbag during an impact event. The proper airbag position may prevent an occupant from being ejected from the vehicle. When a force is applied normal to the unfolded airbag, such as from an impact of an occupant, the airbag may begin to deflect laterally (i.e., cross-car). The tensioning strap restrains the cushion from deflecting laterally.

In some situations it may be beneficial to remove the rod assembly in order to reduce mass and cost. Also, rod type configuration may not tension the airbag vertically during deployment. In some vehicles and configurations it may be advantageous to tension the airbag vertically during deployment to aid the airbag in unfolding properly. Also, alternative embodiments to the rod type system may provide increased storage for other vehicle components, and eliminate additional assembly operations at the customer assembly plant.

Thus, alternative embodiments include a side curtain airbag with a tension tether or tensioning strap that provides support (e.g., substantially vertical tension) to ensure that the airbag unfolds properly during deployment, and to configure the tension tether to attach only to the airbag to obtain benefits (e.g., reduced cost and mass) associated with eliminating the rod assembly. Elimination of the rod assembly also may free up the packaging space to house other vehicle components, and to provide for improved serviceability, by reducing the quantity of trim, which requires removal and replacement, and by reducing the labor (operations) required to replace the airbag system.

Referring generally to the figures, a side curtain airbag system 20 is shown according to an exemplary embodiment for use in an automotive vehicle 10. Airbag system 20 remains packaged and stored in a portion of the vehicle, typically the roof rail, until deployment occurs. A vehicle impact or rollover event triggers deployment of airbag system 20, by an inflator 40, typically having a pyrotechnic device, which generates and forces inflation gas into the inflatable cushion 23 of airbag system 20. During deployment, airbag system 20 remains attached to vehicle 10 by a plurality of attachment members 29, which may protrude vertically from the trailing edge 54 (of deployment) of airbag system 20, causing inflatable cushion 23 to expand in the downward and cross-car directions as it fills with gas. A tension tether 30, having a first end 33 and a second end 35, may be coupled to the airbag first portion 25 and the airbag second portion 27, respectively, to aid in proper deployment and to provide stability from a force of impact, such as from an occupant.

Referring to FIG. 1, an exemplary embodiment of an automotive vehicle 10 is illustrated, and includes airbag system 20 and inflator 40. Airbag system 20 includes an inflatable cushion 23 and a tension tether 30. The cushion 23 is shown in the unfolded or deployed state, which may result from an impact or rollover event of vehicle 10. During a side impact to vehicle 10, a crash sensing system triggers the inflator 40, which maybe located in the roof rail or roof assembly, to rapidly generate and force gas into inflatable cushion 23. Cushion 23 unfolds, from the roof rail of vehicle 10, in the downward direction and expands in the cross-car direction as gas in forced into inflatable cushion 23 by inflator 40.

Referring to FIGS. 2 thru 5, an exemplary embodiment of a side curtain airbag system 20 to protect multiple occupants during an impact or rollover event is illustrated in the unfolded or deployed state. Airbag system 20 includes inflatable cushion 23, airbag first portion 25, airbag second portion 27, a plurality of attachment members 29, tension tether 30, a leading edge 52, and a trailing edge 54.

According to an exemplary embodiment, a plurality of attachment members 29 attach the trailing edge 54 (i.e., the edge of the cushion that trails the remainder of the cushion as the cushion unfolds) of airbag system 20 to a useful location (e.g., roof rail) of vehicle 10 and remain coupled to vehicle 10 during deployment of airbag system 20. According to an exemplary embodiment, airbag system 20 includes one inflatable cushion 23, which, during deployment, expands with gas and unfolds along the internal side of vehicle 10 such that leading edge 52 (i.e., the edge of the cushion that leads the remainder of the cushion as the cushion unfolds) moves in an substantially downward direction away from trailing edge 54 to protect more than one occupant. According to other embodiments, airbag system 20 may include more than one inflatable cushions 23 that may protect different occupants or the same occupant.

Figure 2:
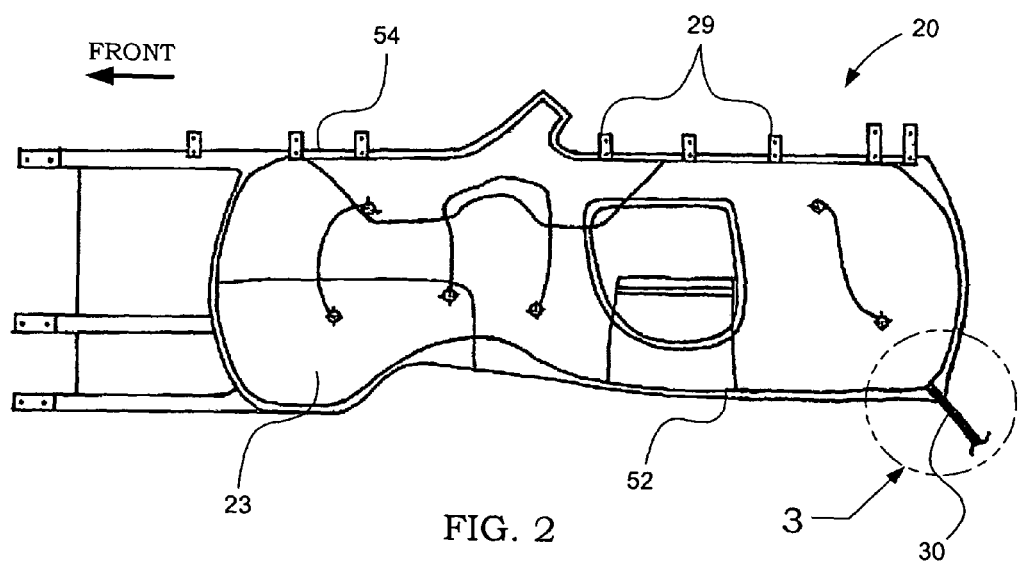
FIG. 2 is an inboard, cross-car (side) view of an exemplary embodiment of an unfolded side curtain airbag system that includes the second end of the tension tether coupled to the second portion to the airbag system.
Figure 3:
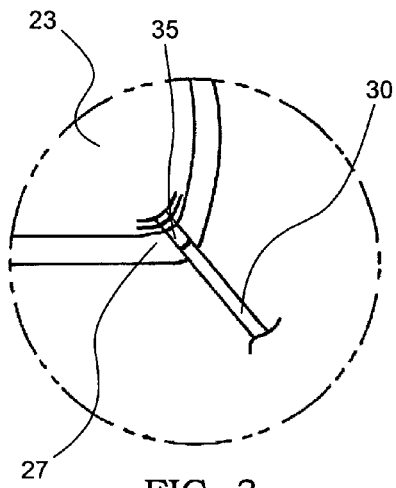
FIG. 3 is a detail view of the second portion of the airbag system shown in FIG. 2 coupled to the second end of the tension tether.

Also referring to FIGS. 2 thru 5, tension tether 30 may be positioned on the outboard side of airbag system 20 to aid in the deployment trajectory of cushion 23, by imparting a tension, which is substantially longitudinal to tension tether 30. The tension assists the cushion or airbag 23 to deploy substantially downward along and proximate to the window and door assembly of vehicle 10. The deployment trajectory of the airbag 23 is critical to provide the maximum occupant protection during an impact or rollover event. According to an exemplary embodiment, tension tether 30 includes a tether first end 33 coupled to the outboard side of airbag first portion 25, and further includes a tether second end 35 coupled to the inboard side of airbag second portion 27, such that an uncoupled tether first end 33 would extend substantially diagonally, at an approximate 45 degree angle from horizontal, as shown in FIGS. 2 and 3. When tether first end 33 and tether second end 35 are both coupled, tension tether 30 may be configured substantially vertical on the outboard side of airbag system 20. According to an exemplary embodiment, airbag first portion 25 may be positioned substantially in the rear and proximate to the trailing edge 54 of airbag 23. Additionally, airbag second portion 27 may be positioned substantially in the rear and proximate to the leading edge 52 of airbag 23.

Figure 4:
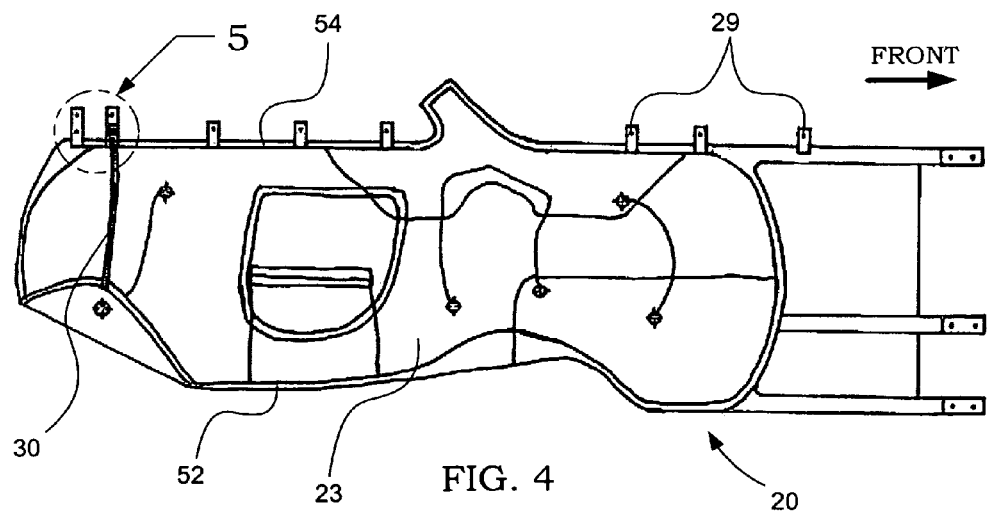
FIG. 4 is an outboard, cross-car (side) view of an exemplary embodiment of an unfolded side curtain airbag system that includes a tension tether coupled at both ends to the airbag system.

Also referring to FIG. 4, when the inertia of an impact event propels an occupant into substantially unfolded airbag 23, generating a lateral (cross-car) force onto airbag system 20, tension tether 30 may provide tension between airbag first portion 25 and airbag second portion 27, which helps airbag 23 maintain a proper shape covering the window and a portion of the door of the vehicle. By maintaining proper shape, airbag 23 may prevent the occupant from being ejected through the window, or impacting the window, during the impact event.

According to other embodiments, tether first end 33 may be coupled to the inboard side of airbag first portion 25, and tether second end 35 may be coupled to the outboard side of airbag second portion 27, such that an uncoupled tether first end 33 would extend in other useful directions (e.g., horizontal, vertical, substantially vertical). Additionally, when both tether first end 33 and tether second end 35 are coupled, tension tether 30 may be configured to run diagonally or may be configured on the inboard side of airbag system 20. According to other embodiments, airbag system 20 may be configured to include multiple tension tethers 30 at similar or varying positions on airbag system 20.

Figure 5:
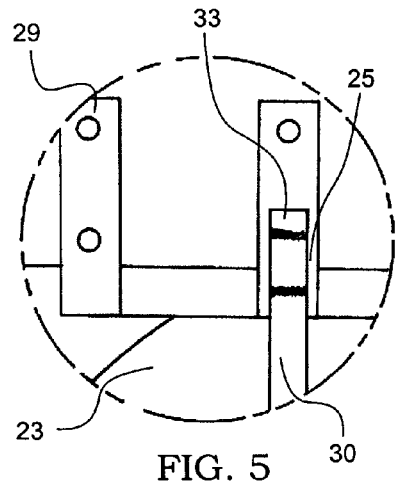
FIG. 5 is a detail view of the first portion of the airbag system shown in FIG. 4 coupled to the first end of the tension tether.
Figure 5B:
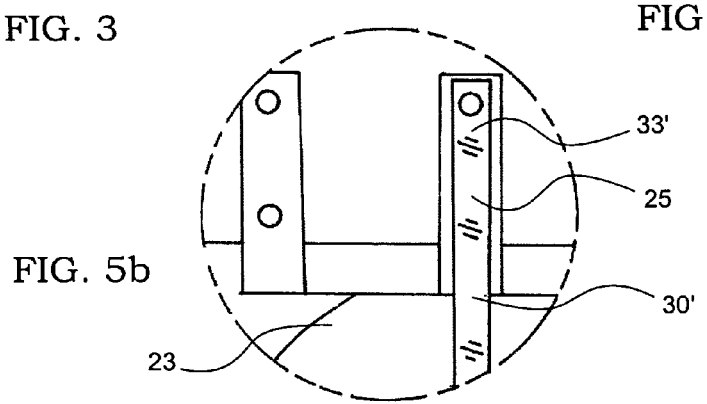
FIG. 5b is a detail view of the first portion of the airbag system shown in FIG. 4, illustrating the first end of the tension tether coupled to the vehicle.

Referring to FIG. 5b, according to other embodiments, tether first end 33' of tether 30' may be coupled directly to vehicle 10, or some other vehicle component. Tether first end 33' may be configured to have a hole or some other useful coupling method, wherein a fastener (e.g., bolt, screw, rivet)

may be used to attach tether first end 33' to vehicle 10 or another component (e.g., a single fastener may be used to attach both the cushion 23 and the tether 30' to the vehicle). According to this embodiment, a non permanent means (e.g., tape) of attaching may be used to retain tether 30' in position during shipping to and assembly by the customer. Additionally, alternative coupling methods may be used in place of a fastener.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the airbag system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant side-impact protection apparatus for a motor vehicle, the apparatus comprising:
    an inflatable cushion stored in a folded configuration;
    an inflator configured to provide gas to inflate to form a curtain to protect the head and upper torso of the occupant of a vehicle, and
    at least one tension tether, having a first end coupled at a first coupling location at an outboard side of a first portion of the cushion and a second end coupled at a second coupling location to an inboard side of a second portion of the cushion, to provide tension to the cushion during its unfolding, wherein the first end is located on the outboard side of the first portion of the cushion at the first coupling location, and wherein the second end is located on the inboard side of the second portion of the cushion at the second coupling location.

2. The protection apparatus of claim 1, wherein the cushion is configured to deploy along the internal side of the vehicle and wherein the first portion of the cushion is located proximate to the rear of the cushion along an edge of the cushion that trails the remainder of the cushion as the cushion unfolds, and wherein the second portion of the cushion is located proximate to the rear of the cushion along an edge of the cushion that leads the remainder of the cushion as the cushion unfolds.

3. The protection apparatus of claim 1, wherein the cushion protects a single occupant.

4. The protection apparatus of claim 1, wherein the cushion protects multiple occupants.

5. The protection apparatus of claim 1, wherein the cushion unfolds in an essentially downward direction.

6. The protection apparatus of claim 1, wherein the tension tether runs diagonally away from the second portion of the cushion, when the second end of the tension tether is coupled to the second portion of the cushion prior to coupling of the first end of the tension tether at the first portion of the cushion.

7. The protection apparatus of claim 1, wherein the tension tether is configured to extend in an essentially vertical direction.

8. The protection apparatus of claim 7, wherein the tension tether, during deployment, provides a tension force on the cushion to prevent the cushion from being displaced.

9. The protection apparatus of claim 1, wherein a trailing edge of the unfolding cushion is fixedly connected by a plurality of fastening members to a motor vehicle.

10. The protection apparatus of claim 9, wherein the cushion is fixedly connected to the roof rail of the motor vehicle.

* * * * *